Figure 6:
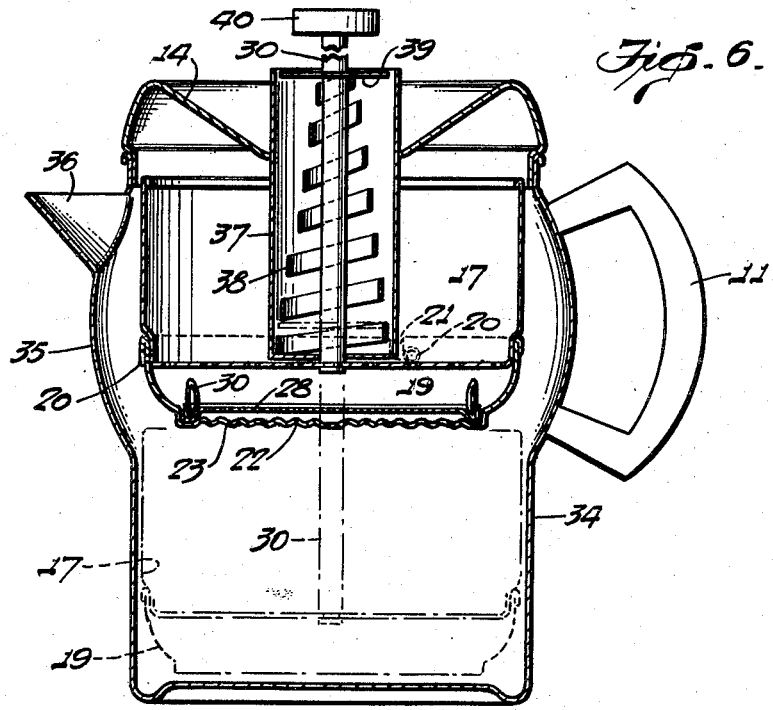

Dec. 28, 1937.  L. WYGODSKY  2,103,704
SPRING DRIP BEVERAGE MAKER
Filed Jan. 5, 1937  2 Sheets-Sheet 1
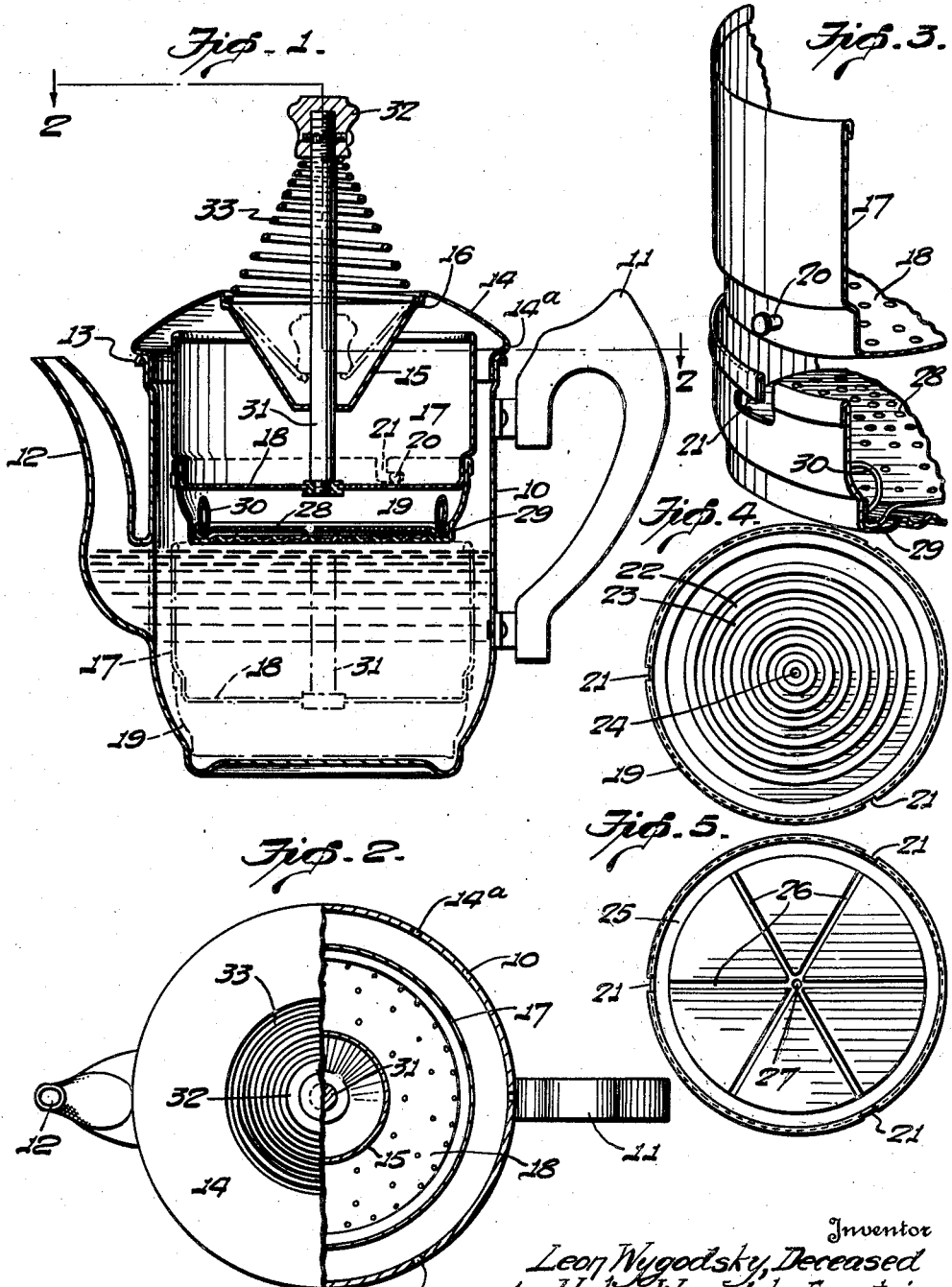
Inventor
Leon Wygodsky, Deceased
by Helen Wygodsky, Executrix Dec. 28, 1937.   L. WYGODSKY   2,103,704
SPRING DRIP BEVERAGE MAKER
Filed Jan. 5, 1937   2 Sheets-Sheet 2

Inventor
Leon Wygodsky, Deceased
by Helen Wygodsky, Executrix

Patented Dec. 28, 1937

2,103,704

UNITED STATES PATENT OFFICE 2,103,704

SPRING DRIP BEVERAGE MAKER

Leon Wygodsky, deceased, late of Baltimore, Md., by Helen Wygodsky, executrix, Baltimore, Md., assignor of one-half to said Helen Wygodsky and one-half to Julienne M. Wygodsky Application January 5, 1937, Serial No. 119,155

6 Claims. (Cl. 53—3)

The invention relates to devices for making all sorts of infusions used for beverage purposes, particularly coffee, and has for its object the provision of a novel device by means of which an infusion such as coffee can be made conveniently and in such manner as to preserve its aroma and its palatability and at the same time producing a purer infusion of the caffeol without the caffetanic acid which is generally present in the beverage when made in the ordinary and well known types of coffee pots, percolators and similar devices where actual boiling is resorted to.

It is known that in order to obtain a pleasant and wholesome coffee infusion, the ground coffee should not be treated with boiling water. It has been found that the temperature of the water should not exceed 200° F. for the reason that below this temperature the pure caffeol is easily extracted whereas above this temperature the caffetanic acid enters into the solution. It is claimed that the caffetanic acid is responsible for digestive disturbances, insomnia, etc. and its elimination is therefore of great importance. It is also known that when the water is at an excessively high temperature the delicate fragrance and palatability of the coffee is greatly impaired.

While some of the existing devices eliminate certain drawbacks, none eliminates all of them. Most of the coffee making devices in present use require the water to come to a boil in order to cause the water to come in contact with the ground coffee. In other instances an extra vessel for boiling the water is required, the water being then poured over the coffee, but under this system in case the infusion is not sufficiently strong it has to be transferred into an extra container from which the weak infusion can be poured over the ground coffee again or as many times as is required to obtain the desired strength. This second mentioned procedure not only multiplies the number of receptacles required but prevents the apparatus from being self-contained and has the additional disadvantage that the infusion is probably cooled to a lower temperature than is desirable. Many of the present coffee making devices are also so constructed that the infusion trickles through the air, consequently becoming partly oxidized with resultant loss of aroma and flavor. This last mentioned objection, namely oxidation, has been recently recognized by the producers or manufacturers of the better grades of ground coffee as evidenced by the fact that their product is packed in vacuumized containers.

It is with all the above facts in view that the present invention has been devised, an important object of which is to provide an infusion making device, particularly suitable for coffee, which is entirely self-contained, which operates at a water temperature lower than the boiling point and which prevents contact of the infusion with the air, thereby preventing oxidation, these characteristics combining to produce a wholesome beverage having maximum pleasing aroma and flavor.

Another object of the invention is to provide a self-contained device of this character in which the water, or the infusion, may be brought into contact with the ground coffee as many times as may be required to obtain a beverage of the desired strength without the extraction of caffetanic acid such as results from prolonged boiling in an ordinary type of coffee pot or percolator.

Still another object is to provide a device of this character in which the ground coffee is subjected, automatically, to the extracting influence of the hot water for a more or less predetermined length of time.

A more specific object of the invention is to provide a coffee making device which is entirely self-contained and in which the ground coffee is submerged in the heated water which is thereby transferred to a position above the coffee so that it will be caused to trickle through the ground coffee until all the water has passed therethrough and returned to its original position in the center of the device, it being a feature that this action may be repeated as many times as necessary.

An additional object is to provide a coffee making device which is spring operated, which consists of but few parts which are easily accessible and detachable from one another for cleaning purposes, which will be simple and inexpensive to manufacture, convenient to use, neat and attractive in appearance and a general improvement in the art.

Figure 7:
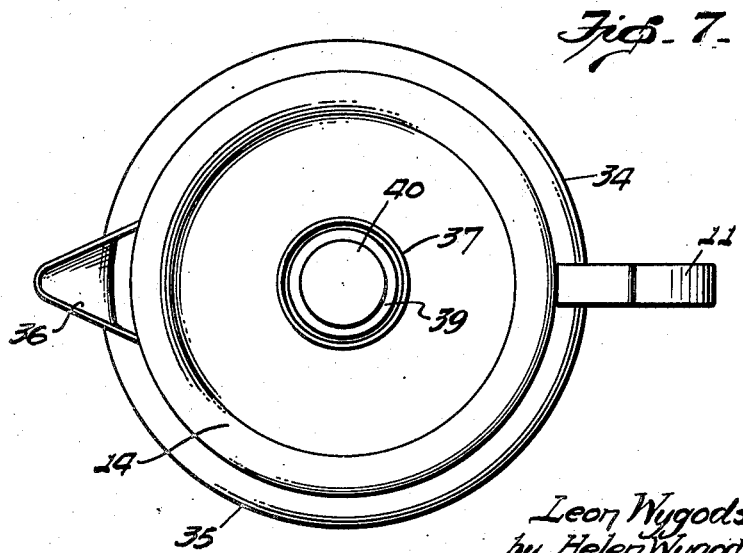

To the attainment of the foregoing and other objects and advantages, the invention preferably consists in the details of construction and the arrangement and combination of parts to be hereinafter more fully described and claimed, and illustrated in the accompanying drawings in which:

Figure 1 is a vertical sectional view through one form of the device,

Figure 2 is a view partly in plan and partly in cross section taken on the line 2—2 of Figure 1, Figure 3 is a fragmentary perspective view showing the water container and the coffee basket disconnected, Figure 4 is a plan view of one form of the coffee basket, Figure 5 is a similar view of a modification, Figure 6 is a vertical section through another form of the device, and Figure 7 is a plan view thereof.

Referring more particularly to the drawings the first form of the invention comprises a receptacle 10 made of any desired material capable of withstanding heat and having any preferred finish. This receptacle may be made in the shape commonly used for coffee pots and percolators and is provided at one side with a suitably mounted handle 11 and at its opposite side with a spout 12. This receptacle is open at the top and has a preferably beaded edge 13 as is a common practice. The top of the receptacle is adapted to be closed by a cover 14 telescopically engaged therewith and having its edge portion formed with a plurality of small holes 14ª for the escape of steam so as to prevent hot water from being forced out through the spout 12. At its central portion the cover is formed or otherwise provided with a depending frusto-conical guide 15 the top of which is of slightly enlarged diameter to provide an annular ledge or seat 16.

Disposed within the receptacle 10 and vertically movable with respect thereto is a cup-like water container 17 open at the top and having a perforated bottom 18. Telescopically engaged about the preferably inwardly offset lower portion of the water container 17 is a coffee basket 19 detachably held in place by means of a plurality of outwardly extending studs 20 projecting from the water container and engaged within bayonet slots 21 in the upper edge of the coffee basket. The coffee basket may have its bottom formed with a series of concentric alternate ridges and grooves 22 and 23, respectively, together with a central hole 24, as shown in Figures 1, 3 and 4, though, if preferred, use may be made of the modified form of basket 25 shown in Figure 5 wherein the bottom is disclosed as formed with a series of radial grooves 26 extending outwardly from a central hole 27. These are the preferred types though it is possible to resort to variations if desired.

The basket 19 or 25 is intended to contain coffee in ground form and in order to prevent clogging of the grooves 23 or 26 and stoppage of the hole 24 or 27, it is preferable to dispose within the basket a perforated or otherwise foraminous or reticulated disk 28 having a downwardly extending marginal portion 29 seating upon the bottom of the basket at the circumference thereof so that the major portion of the disk will be spaced above the bottom of the basket. For convenience, the disk 28 may be provided at opposite sides with upstanding finger holds 30 which may be conveniently formed as wire loops or rings secured in place in any desired manner.

The intention is that the receptacle 10 be partly filled with water and, as mentioned above, the desired quantity of ground coffee be placed within the coffee basket 19 or 25, after which the coffee basket and water container 17 are to be submerged in the water. To accomplish this there is provided a push rod 31 attached to the bottom of the water container 17 and slidable through the guide 15. The upper end of the push rod is equipped with an abutment element such as the knob 32 which may be detachable or fixed, whichever is preferred. Likewise, the connection of the push rod with the bottom of the water container may be permanent or detachable, at the option of the manufacturer though the latter is illustrated in Figure 1. If the knob 32 is detachable the push rod may well be fixed but if the connection of the push rod with the water container is detachable then it is probably preferable that the knob be fixed. It is considered that these variations are of minor importance inasmuch as the only requirement is that the parts be capable of disassembly for cleaning purposes. Engaged upon the ledge or seat 16 is a conical spring 33 which abuts against the underside of the knob 32 for the purpose of urging upwardly the water container and coffee basket, together with their contents.

In the use of the device it is necessary to remove the cover 14 and detach the coffe basket 19 from the water container 17, the bayonet slot connection readily permitting this, after which the desired amount of ground coffee is placed upon the disk 28 in the coffee basket. Water is of course placed within the receptacle 10 to the desired level which ordinarily should be about half its height. The coffee basket is then telescoped upon the water container 17 and partly turned to reestablish the bayonet slot connection. After this the assembled water container 17 and coffee basket 19 are disposed within the receptacle 10 and the cover 14 is reapplied. The parts will then be in the position shown in Figure 1 and it is of course necessary that heat be applied to the receptacle 10 by any appropriate means to elevate the temperature of the water to the desired degree. The user then presses upon the knob 32 against the resistance of the spring 33 and thereby forces the water container 17 and coffee basket 19 as a unit down into the bottom of the receptacle 10 as shown by the dot and dash lines in Figure 1. As the water container 17 and basket 19 are of somewhat less diameter than the receptacle 10 the water within the latter will rise in the resultant space and will overflow the edge of and fill the water container 17. The parts can readily be so proportioned that all or practically all of the water within the receptacle 10 will be thus transferred to the water container 17. The strength of the spring 33 should be so proportioned to the weight of the water container 17 and coffee basket 19, together with their contents that they will remain at the bottom of the receptacle 10. The water thus transferred to the water container 17 passes through the perforated bottom thereof and trickles through the mass of ground coffee, thereby extracting the essence therefrom. The water saturating and then passing through the ground coffee enters the space beneath the disk 28 and passes onto the bottom of the coffee basket from which it drips through the hole 24 or 27, as the case may be. As this progresses the weight of the water container 17 and coffee basket 19 gradually decreases and they will therefore slowly rise under the influence of the spring 33 and return to the initial elevated position, at which time the water container 17 will be empty and the made coffee will be in the bottom of the receptacle 10. If the infusion thus produced is not sufficiently strong the operation may be repeated as often as necessary. After use, the spent or exhausted grounds are removed by detaching the basket 19 and lifting out the disk 28 by means of the finger holds 30. Cleansing is of course effected by separating the parts and washing them.

In Figures 6 and 7 there is shown a modification wherein the water receptacle 34 is of somewhat different shape from that above described, in that at its upper portion it is bulged outwardly as shown at 35 so as to reduce the likelihood of any hot water splashing out of the spout 36 when the assembled water container 17 and coffee basket 19 are forced down into the water. This form varies from the previously described one in another particular, namely that the cover 14 is provided with a depending tubular guide 37 of cylindrical rather than frusto-conical shape and within which is housed a volute spring 38 abutting at its lower end against the bottom of the tubular guide 37 and at its upper end against a disk 39 secured to the push rod 30. In this instance the push rod is equipped with a knob 40 of somewhat different shape from that disclosed in Figure 1 and is represented as permanently secured to the bottom of the water container 17. In every other respect this form of the device is the same as the first form and operates in identically the same manner. Possibly two features of advantage in this modification are the outward bulge of the pot or container and the fact that the operating spring is at all times concealed.

From the foregoing description and a study of the drawings it will be apparent that there is thus provided a simply constructed and very convenient device by means of which a highly palatable beverage may be prepared especially if care be taken to avoid boiling. This results partly from the fact that the infusion trickling through the hole or holes in the bottom of the coffee basket does not come in contact with the air and is therefore not oxidized with resultant impairment of flavor. It is believed from the foregoing that the construction, operation and advantages will be readily apparent to one skilled in the art without further explanation.

While there has been shown and described the preferred embodiments of the invention it should be understood that the right is reserved to make all such changes in the details of construction as will not depart from the spirit of the invention or the scope of the claims hereunto appended.

Having thus described the invention, what is claimed is:

1. An infusion making device comprising a receptacle for water, a cover for closing the top of the receptacle, said cover having a depending central guide thereon, a coffee basket having a detachable perforated bottom closure member and a water container the lower end of the latter fitting within and being detachably connected to said basket, said container and basket constituting an assembly vertically movable within the receptacle, a push rod connected with said assembly and slidable through said guide, and a spring connected with said push rod for normally urging said assembly upwardly.

2. An infusion making device comprising a receptacle for water, a cover telescopically engaged with the receptacle and having a depending hollow portion constituting a guide, a coffee basket and a water container having a detachable bayonet slot connection and constituting an assembly vertically movable within the receptacle, a push rod connected with the water container and slidable through said guide and projecting above the cover, an abutment member on the push rod adapted to receive manual pressure, and a conical spring seating upon the cover and reacting against said abutment member for urging said assembly upwardly, said depending hollow portion being adapted to house the spring when the latter is moved downwardly upon the application of pressure upon the abutment member.

3. An infusion making device comprising a receptacle for water, a cover telescopically engaged with the receptacle and having a depending hollow portion constituting a guide, a coffee basket and a water container having a detachable bayonet slot connection and constituting an assembly vertically movable within the receptacle, a push rod connected with the water container and slidable through said guide and projecting above the cover, an abutment member on the push rod adapted to receive manual pressure, and a conical spring seating upon the cover and reacting against said abutment member for urging said assembly upwardly, said cover being formed with an annular seat surrounding said depending hollow portion and spaced therefrom and constituting retaining means for the lower end of the spring, the latter being adapted to be housed between said guide and said spring retaining means when compressed.

4. An infusion making device comprising a receptacle for water, a cover detachably connected with the receptacle and having a central guide, a coffee basket having an apertured bottom, a water container above the coffee basket, said coffee basket and water container having a telescopic connection and a bayonet slot connection, the water container having a reticulated bottom, a push rod connected with the bottom of the water container and slidable through said guide and projecting above the cover, an abutment member on the push rod, a conical spring reacting against said abutment member for urging the coffee basket and water container as an assembly into an elevated position, and a reticulated tray removably mounted within the coffee basket and having a depending peripheral portion seating upon the bottom of the coffee basket whereby the major portion of said tray will be spaced above the bottom of the coffee basket.

5. An infusion making device comprising a receptacle for water, a cover detachably connected with the receptacle and having a central guide, a coffee basket having an apertured bottom, a water container above the coffee basket, said coffee basket and water container having a telescopic connection and a bayonet slot connection, the water container having a reticulated bottom, a push rod connected with the bottom of the water container and slidable through said guide and projecting above the cover, an abutment member on the push rod, and a conical spring reacting against said abutment member for urging the coffee basket and water container as an assembly into an elevated position, the bottom of the coffee basket having a plurality of liquid conducting channels therein.

6. An infusion making device comprising a receptacle for water having a handle and a spout, a coffee basket, a water container mounted above and detachably connected with said coffee basket, said water container and coffee basket being vertically movable as an assembly within the receptacle, a cover for the receptacle, a depending tubular member carried by the cover having a central hole at its bottom, a push rod connected with the bottom of said water container, slidable through said hole and projecting above the cover, an operating button at the upper end of said push rod, an abutment disk carried by the push rod and normally located at the upper portion of said tubular member, and a conical spring seating upon the bottom of said tubular member and reacting against said disk, said disk serving as a substantial closure for the tubular member and concealing said spring.

HELEN WYGODSKY,
*Executrix of the Last Will and Testament of Leon Wygodsky, Deceased.*